United States Patent [19]

Shields

[11] Patent Number: 4,465,517

[45] Date of Patent: Aug. 14, 1984

[54] DENTURE ADHESIVE COMPOSITION

[75] Inventor: Susan J. Shields, Newark, Del.

[73] Assignee: Hercules Incorporated, Wilmington, Del.

[21] Appl. No.: 519,341

[22] Filed: Aug. 1, 1983

[51] Int. Cl.$^3$ ............................ C09K 3/00; C08L 5/00
[52] U.S. Cl. ...................................... 106/35; 106/208
[58] Field of Search ................. 106/35, 205, 208, 209; 433/180; 536/114

[56] References Cited

U.S. PATENT DOCUMENTS

| | | | |
|---|---|---|---|
| 3,029,187 | 4/1962 | Steinhardt et al. | 433/180 |
| 3,029,188 | 4/1962 | Cyr et al. | 433/180 |
| 3,440,065 | 4/1969 | Laurence | 106/35 |
| 4,280,936 | 7/1981 | Dhabhar et al. | 260/13 |
| 4,373,036 | 2/1983 | Chang et al. | 523/120 |

FOREIGN PATENT DOCUMENTS 650493 10/1962 Canada ................................ 433/180

OTHER PUBLICATIONS

*Industrial Gums,* "Whistler", Mar. 1974, p. 310.

*Primary Examiner*—Theodore Morris
*Attorney, Agent, or Firm*—Joanne L. Horn

[57] ABSTRACT

Disclosed are improved denture adhesive compositions comprising a hydroxypropyl guar having a M.S. of greater than 0.4, or a hydroxypropyl guar having a M.S. of 0.4 or less and an alkali metal salt of carboxymethyl cellulose having a D.S. of at least 0.3, in a petrolatum base. Optionally, the compositions can include a hydrophobically modified alkyl or hydroxyalkyl cellulose.

14 Claims, No Drawings

DENTURE ADHESIVE COMPOSITION

This invention relates to denture adhesive compositions, specifically to denture adhesive cream compositions having excellent adhesion properties.

The use of dental prostheses as replacements for teeth is now widespread. Advances in the art, particularly in plastic and alloy chemistry, have made it possible to produce dentures which not only function better, but are markedly improved in appearance. The most common types of dental prostheses are (1) bridgework, fixed or removable, which are generally used to replace up to three missing teeth; (2) partial dentures, which are removable and are used when several teeth are missing; and (3) full dentures which are removable when all teeth of the upper or lower jaw or both have been removed or otherwise lost.

Concomitantly with the use of dentures, especially full dentures, denture adhesive compositions, first in powder form and later in cream form, were developed. Although there has been some dissent in the dental community as to whether denture adhesives should be used, they have come to be used extensively by the dental plate wearers. Basically, the dissenting opinion of the dental authorities rests on the belief that such adjuvant compositions are used as or become a substitute for proper fitting dentures or plates, and that the prior art denture adhesive compositions do not perform well under the wide range of conditions present in the oral cavity over any appreciable period of time, i.e., at least eight hours or more.

The denture adhesive is used by applying it to the face of the denture or plate which is particularly adapted to contact and mold itself to the contour of a particular oral surface in the mouth, and the placing the denture in the mouth against and in contact with the oral surface.

Desirably, a denture adhesive should not be readily soluble in the fluids present in or taken into the mouth, should be resistant to the extreme changes in the temperature of the fluids taken in the mouth, and should be able to accomodate variations in the denture wearer's diet which results in diverse chemical characteristics, including pH. Further, the denture adhesive should have good adhesion or cohesion properties over a long period of time. These performance criteria are essential if the denture or plate is to be held in its place in the mouth by the denture adhesive composition, particularly during the mastication of foods and the drinking of beverages.

For years the majority of denture adherant creams used to secure dentures in the mouth were prepared from finely ground particles of natural gums, such as karaya, acacia, guar, and tragacanth, dispersed in cream base, which is usually petrolatum.

More recently, denture creams have been prepared with cellulosic materials, such as sodium carboxymethyl cellulose, hydroxyethylcellulose, and hydroxypropylcellulose either alone or in combination with ethylene oxide homopolymers, acrylamide homopolymers and copolymers, or maleic anhydride derivatives to improve the adhesion properties of the denture cream. Generally, such materials were dispersed in a petrolatum, in a mineral oil, or in a mixture of petrolatum and mineral oil carrier.

These denture adhesive cream formulations provided some improvement over the traditional compositions containing only a natural gum in a petrolatum carrier. However, these compositions only effectively secure the dentures in the mouth over short periods of time. Therefore, it has generally been necessary to apply more than one application of the denture adhesive per day in order to obtain and maintain sufficient adhesion throughout the day. Multiple applications of the adhesive are not only inconvenient, but are usually impractical if not impossible. Hence, there is a need for a denture adhesive which exhibits superior adhesive properties over long periods of time.

This invention provides denture adhesive cream compositions containing hydroxypropyl guar having a certain molecular substitution of hydroxypropyl groups per anhydrohexose unit of the guar molecule, or a combination of the hydroxypropyl guar and a water-soluble salt of carboxymethyl cellulose dispersed in a carrier. The compositions of this invention afford superior adhesion or cohesion properties under the variable environmental conditions encountered in the mouth over a substantially increased period of time. Moreover, the compositions do not have a greasy, oily or gritty mouthfeel.

The principal ingredient of the denture compositions of this invention is a finely divided hydroxypropyl guar alone or in combination with a finely-divided alkali metal salt of carboxymethyl cellulose. Preferably the hydroxypropyl guar has an average molecular weight of from about 250,000 to about 1,250,000, most preferably from about 500,000 to about 1,000,000.

When hydroxypropyl guar is used alone, it usually has a molecular substitution (M.S.) of hydroxypropyl groups of greater than 0.4 per anhydrohexose unit of the guar molecule. Preferably, the M.S. is from about 0.5 to about 1.0.

When a hydroxypropyl guar having a M.S. of greater than 0.4 is the only adhesive component, it is generally present at a concentration of from about 5% to about 50%, by weight, preferably from about 20% to about 50%.

If a hydroxypropyl guar having a M.S. of 0.4 or less to about 0.3 is used in the compositions of this invention, then it must be combined with a finely divided alkali metal salt of carboxymethyl cellulose, preferably the sodium or calcium salt. If a hydroxypropyl guar having a M.S. of greater than 0.4 is used, it can be combined with a finely divided alkali metal salt of carboxymethyl cellulose. Preferably the salt of carboxymethyl cellulose has a degree of substitution (D.S.) of at least 0.3, a molecular weight of from about 50,000 to about 1,250,000, and is present in amount from about 10% to about 45%. Most preferably the D.S. is from about 0.6 to about 1.6 and the molecular weight is from about 300,000 to about 1,250,000. Degree of substitution is the number of carboxymethyl groups per anhydroglucose unit of the cellulose molecule.

The hydroxypropyl guar can be prepared by the method of U.S. Pat. No. 3,723,408, and the salt of carboxymethyl cellulose by the method described in R. L. Whistler & J. N. BeMiller "Industrial Gums", 696 (2d ed. 1973).

The carrier or vehicle can be petrolatum or a combination of petrolatum and mineral oil. The carrier is present at a concentration of from about 35% to about 85% by weight. When a combination of petrolatum and mineral oil is used as the carrier, the petrolatum is present at a concentration of from about 40% to about 80% and the mineral oil at a concentration of from about 1% to about 15%.

The compositions of this invention can also contain up to 20% of a hydrophobically modified alkyl or hydroxyalkyl cellulose to assist in lessening the greasiness or oiliness of the compositions in the mouth. Typical alkyl or hydroxyalkyl celluloses are methyl, hydroxyethyl and hydroxypropyl cellulose which are further substituted with a $C_{10}$ to $C_{24}$ long chain alkyl group in an amount from about 0.2 weight percent to about the amount which renders the alkyl cellulose or hydroxyethyl cellulose less than 1% by weight soluble in water. The term "long chain alkyl group" is meant to include not only the long chain hydrocarbon portion, but any other portion present, such as an ether, ester, or urethane radical, as a result of the particular compound used to modify the alkyl or hydroxyalkyl cellulose substrate. The hydrophobically modified alkyl or hydroxyalkyl celluloses can be prepared by the method set forth in U.S. Pat. No. 4,228,277. A hydrophobically modified hydroxyethyl cellulose is preferred.

In addition, the denture adhesive creams of this invention can contain other water swellable or soluble polymers, such as polyoxyethylene, polyacrylamide, acrylamide-acrylic acid copolymers and maleic anhydride derivatives. Other excipient materials, such as fillers, flavoring agents, coloring agents and preservatives can also be included in the compositions of this invention. Typical fillers include dicalcium phosphate, calcium carbonate, and talc. The fillers can be present in an amount from about 0.1% to about 20%.

To further illustrate this invention, various illustrative examples are set forth below.

All parts and percentages are by weight, unless otherwise specified, throughout the specification and claims.

EXAMPLE 1

This example illustrates an embodiment of the denture adhesive composition of this invention and how to prepare it.

A hydroxypropyl guar (50%) having a 0.9 M.S. is added to an equal quantity of petrolatum (50%) in a mixing kettle and stirred until the ingredients are thoroughly mixed.

EXAMPLE 2

This example illustrates another embodiment of the denture adhesive composition of this invention.

The composition is prepared according to the procedure of Example 1 with the exception that a hydroxypropyl guar having a 0.6 M.S. is used instead of the hydroxypropyl guar having a 0.9 M.S.

EXAMPLE 3

This example illustrates another embodiment of the denture adhesive composition of this invention.

The composition is prepared according to the procedure of Example 1 with the formulation of Example 1 except that 45% hydroxypropyl guar is used instead of 50% hydroxypropyl guar, and except that 5% mineral oil is added.

EXAMPLE 4

This example illustrates another embodiment of the denture adhesive composition of this invention.

The composition is prepared according to the procedure of Example 1 with the formulation of Example 2 except that 45% hydroxypropyl guar is used instead of 50% hydroxypropyl guar, and except that 5% mineral oil is added.

EXAMPLE 5

This example illustrates another embodiment of the denture adhesive composition of this invention.

The composition is prepared according to the procedure of Example 1 using 20% hydroxypropyl guar having a 0.5 M.S., 30% sodium carboxymethyl cellulose (CMC) having a 0.7 D.S. and 50% petrolatum.

EXAMPLE 6

This example illustrates another embodiment of the denture adhesive composition of this invention.

The composition is prepared according to the procedure of Example 1 with the formulation of Example 5 except that 25% CMC is used instead of 30% CMC, and except that 5% mineral oil is added.

To characterize the compositions of this invention the following tests were conducted.

Adhesion test: A $3'' \times \frac{3}{4}''$ methylmethacrylate plate and a $3'' \times \frac{3}{4}''$ spunbonded polyester sheet are dipped in distilled water. A 0.5 g. sample of the denture adhesive composition is placed on and spread over a 2" length of the plate. The plate is covered with the spunbonded polyester sheet, and then manually pressed flat.

The test plate is then placed in a crystallization dish filled halfway with distilled water and equipped with a magnetic stirrer. The dish is covered with aluminum foil and placed on a stirrer base which is set for light agitation. Stirring is maintained for 4 hours to age the samples.

After 4 hours, the test plates are removed from the dish and blotted dry with paper towels. The bond strength (adhesion) is then measured on an Instron tester, equipped with Microcon 2 data acquisition system, at a rate of pull of 5"/min. The peak load is printed out in grams of force.

Tack and stiffness test: One gram (1.0 g.) SD Alcohol 40 is added to 10 g. of the denture adhesive composition in a 150 ml. beaker and stirred with an aluminum spatula until the ingredients are thoroughly mixed. Nineteen grams of distilled water (19.0 g.) are added and stirring is continued until a homogeneous mixture is obtained.

The mixture is then transferred to a Petri dish and evenly distributed over the bottom of the Petri dish with the spatula. The dish is covered and allow to set for 24 hours.

The dish is uncovered and centered on the sample plate of a Voland Stevens LFRA texture analyzer. A $\frac{1}{2}''$ diameter butyl methacrylate probe is activated at 1 mm/sec. and placed at a depth of 4 mm into the sample. The resistance and adhesion to the probe, which is a measurement of stiffness and tack, respectively, is recorded in grams.

The test results for the compositions of this invention embodied in Examples 1–6 are set forth in Table 1 below.

TABLE 1

| Example No. | Adhesion (g.) | Stiffness (g.) | Tack (g.) |
| --- | --- | --- | --- |
| 1 | 201.5 | 250 | 30 |
| 2 | 165.7 | 455 | 38 |
| 3 | 155.5 | 163 | 23 |
| 4 | 133.5 | 165 | 30 |
| 5 | 69.8 | 385 | 38 |
| 6 | 131.5 | 320 | 32 |

In vitro tests of current art compositions A and B were conducted, wherein composition A contains 15% polyoxyethylene, 35% CMC, 5% mineral oil and 50% petrolatum, and composition B contains 10% polyoxyethylene, 35% CMC, 10% mineral oil and 50% petrolatum. Compositions A and B gave the test results shown in Table II below.

TABLE II

| Compositions | Adhesion (g.) | Stiffness (g.) | Tack (g.) |
|---|---|---|---|
| A | 76.5 | 305 | 35 |
| B | 99.0 | 235 | 40 |

Thus, this invention provides a novel denture adhesive composition having superior adhesion characteristics.

Features, advantages and other specific embodiments of this invention will become readily apparent to those exercising ordinary skill in the art after reading the foregoing disclosures. In this regard, while specific embodiments of this invention have been described in considerable detail, variations and modifications of these embodiments can be effected without departing from the spirit and scope of the invention as disclosed and claimed.

What is claimed is:

1. A denture adhesive composition comprising:
   (a) from about 5% to about 50% of a hydroxypropyl guar having an M.S. greater than 0.4;
   (b) from about 35% to about 85% of a petrolatum; and
   (c) 0% to about 15% of a mineral oil.

2. The composition of claim 1 wherein the hydroxypropyl guar has a M.S. from about 0.5 to about 1.0.

3. The composition of claim 1 wherein the hydroxypropyl guar is present in an amount from about 20% to about 50%.

4. The composition of claim 1 wherein the hydroxypropyl guar has a molecular weight from about 250,000 to about 1,250,000.

5. A denture adhesive composition comprising:
   (a) from about 5% to about 35% of a hydroxypropyl guar having an M.S. less than 0.4;
   (b) from about 10% to about 45% of an alkali metal salt of carboxymethyl cellulose;
   (c) from about 40% to about 80% of a petrolatum; and
   (d) 0% to about 15% mineral oil.

6. The composition of claim 5 wherein the hydroxypropyl guar has a M.S. of 0.4 to about 0.3 and the alkali metal salt of carboxymethyl cellulose has a D.S. of at least 0.3.

7. The composition of claim 5 wherein the hydroxypropyl guar has a M.S. from about 0.3 to about 1.0 and the metal salt of carboxymethyl cellulose has a D.S. from about 0.6 to about 1.6.

8. The composition of claim 7 wherein the hydroxypropyl guar has a molecular weight from about 250,000 to about 1,250,000 and the alkali metal salt of carboxymethyl cellulose has a molecular weight from about 50,000 to about 1,250,000.

9. The composition of claim 1 wherein the composition further comprises from about 1% to about 20% of a hydrophobically modified hydroxyalkyl cellulose.

10. The composition of claim 9 wherein the hydrophobically modified hydroxyalkyl cellulose is a hydrophobically modified hydroxyethyl cellulose.

11. The composition of claim 5 wherein the composition further comprises from about 1% to about 20% of a hydrophobically modified hydroxyalkyl cellulose.

12. The composition of claim 11 wherein the hydrophobically modified hydroxyalkyl cellulose is a hydrophobically modified hydroxyethyl cellulose.

13. A denture adhesive composition comprising:
   (a) from about 5% to about 50% of a hydroxypropyl guar having an M.S. greater than 0.4;
   (b) from about 40% to about 80% of a petrolatum; and
   (c) 1% to about 15% of a mineral oil.

14. The composition of claim 13 which further comprises from about 10% to about 45% of an alkali metal salt of carboxymethyl cellulose.

* * * * *